US008499183B2

(12) United States Patent
Lai et al.

(10) Patent No.: US 8,499,183 B2
(45) Date of Patent: Jul. 30, 2013

(54) PLUG ASSEMBLY ADAPTED TO AN ADAPTER AND A COMPUTER DEVICE

(75) Inventors: Yen-Chang Lai, New Taipei (TW); Chien-Heng Kuo, New Taipei (TW); Jia-Hung Lee, New Taipei (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 148 days.

(21) Appl. No.: 13/297,242

(22) Filed: Nov. 15, 2011

(65) Prior Publication Data

US 2012/0329332 A1 Dec. 27, 2012

(30) Foreign Application Priority Data

Jun. 21, 2011 (TW) ............................ 100121603 A

(51) Int. Cl.
*G06F 1/00* (2006.01)

(52) U.S. Cl.
USPC ........................................................ 713/340

(58) Field of Classification Search
USPC ................ 439/660, 851, 850, 842, 845, 849, 439/217, 218, 222; 713/340
See application file for complete search history.

(56) References Cited

U.S. PATENT DOCUMENTS

| | | | | |
|---|---|---|---|---|
| 3,522,575 | A * | 8/1970 | Johnson et al. | 439/281 |
| 3,850,495 | A * | 11/1974 | Glover | 439/273 |
| 5,290,191 | A * | 3/1994 | Foreman et al. | 439/225 |
| 6,099,329 | A * | 8/2000 | Goff et al. | 439/131 |
| 7,028,202 | B2 * | 4/2006 | Long et al. | 713/340 |
| 7,172,428 | B2 * | 2/2007 | Huang | 439/11 |
| 2004/0018774 | A1 * | 1/2004 | Long et al. | 439/620 |

FOREIGN PATENT DOCUMENTS

TW I325354 6/2010

* cited by examiner

*Primary Examiner* — Tulsidas C Patel
*Assistant Examiner* — Phuongchi T Nguyen
(74) *Attorney, Agent, or Firm* — Winston Hsu; Scott Margo

(57) ABSTRACT

A plug assembly includes a first plug and a second plug. The first plug includes a main body whereon a first positive electrode, a first negative electrode and a first engaging portion are formed. The second plug has a chamber structure formed inside for containing the main body. A second positive electrode, a second negative electrode and a second engaging portion are formed on the chamber structure and located in positions corresponding to the first positive electrode, the first negative electrode and the first engaging structure, respectively. As the chamber structure completely contains the main body, the second positive electrode and the second negative electrode are respectively coupled to the first positive electrode and the first negative electrode, and the second engaging portion engages the first engaging portion, such that the main body is hold inside the chamber structure.

5 Claims, 9 Drawing Sheets

PLUG ASSEMBLY ADAPTED TO AN ADAPTER AND A COMPUTER DEVICE

BACKGROUND OF THE INVENTION

1. Field of the Invention

The present invention relates to a plug assembly, and more particularly, to a plug assembly adapted to an adapter and a computer device.

2. Description of the Prior Art

Generally speaking, a conventional power plug of a notebook computer is cylindrical. When a plug connected to an adapter is coupled to the power jack of the notebook computer, the adapter is capable of charging a battery of the notebook computer or directly supplying electrical power to the notebook computer for a user to perform operation such as typing, playing multi-media and so on. However, since the power jack and the plug are hard to be separated from each other due to the cylindrical designs, the aforesaid power jack is easy to be damaged when the cable with the adapter and the plug is pulled, so as to cause the notebook computer to damage. As a result, it forces the user to change components such as the power jack and thus results in inconvenience of the notebook computer in use.

SUMMARY OF THE INVENTION

The present invention provides a plug assembly adapted to an adapter and a computer device for solving above drawbacks.

According to the claimed invention, a plug assembly includes a first plug and a second plug. The first plug includes a main body and a first positive electrode, a first negative electrode and a first engaging portion are formed on the main body. A second plug has a chamber structure for containing the main body. A second positive electrode, a second negative electrode and a second engaging portion are formed on the chamber structure and respectively located in positions corresponding to the first positive electrode, the first negative electrode and the first engaging structure. The second positive electrode and the second negative electrode are respectively coupled to the first positive electrode and the first negative electrode, and the second engaging portion engaging the first engaging portion, such that the main body is hold inside the chamber structure as the chamber structure completely contains the main body. One of the first plug and the second plug is coupled to the adapter, and the other one of the first plug and the second plug is coupled to the computer device.

According to the claimed invention, the main body of the first plug is substantially a spherical structure, and the chamber structure of the second plug is substantially a spherical chamber structure.

According to the claimed invention, the first positive electrode is a contact structure disposed on a surface of the spherical structure, the first negative electrode is a ring-shaped structure surrounding the surface of the spherical structure, and the first negative electrode and the first positive electrode of the first plug contact the second negative electrode and the second positive electrode of the second plug in sequence when the main body is inserted into the chamber structure.

According to the claimed invention, the first engaging portion is a ring-shaped recess surrounding to the surface of the spherical structure, the second engaging portion is a ring-shaped protrusion, and the spherical structure guides the ring-shaped protrusion to engage the ring-shaped recess when the spherical structure is inserted into the chamber structure.

According to the claimed invention, the first engaging portion is combined with the first negative electrode, and the second engaging portion is combined with the second negative electrode.

According to the claimed invention, the first positive electrode, the first negative electrode and the first engaging portion, and the second positive electrode, the second negative electrode and the second engaging portion are integrally formed on the main body and the chamber structure in an insert molding manner, respectively.

According to the claimed invention, the first positive electrode and the first negative electrode, and the second positive electrode and the second negative electrode are integrally formed on the main body and the chamber structure in an insert molding manner, respectively.

According to the claimed invention, the main body of the first plug is substantially a square post structure, and the chamber structure of the second plug is substantially a square chamber structure.

According to the claimed invention, the first negative electrode and the first positive electrode of the first plug contact the second negative electrode and the second positive electrode of the second plug in sequence when the main body is inserted into the chamber structure.

According to the claimed invention, one of the first engaging portion and the second engaging portion is a hook structure, and the other one of the first engaging portion and the second engaging portion is a slot structure.

According to the claimed invention, the second negative electrode is coupled to a grounding end.

In summary, the present invention utilizes the first engaging portion disposed on the main body of the first plug to engage the second engaging portion on the chamber structure of the second plug, so as to make the main body be contained in the chamber structure as well as make the first positive electrode and the second negative electrode on the main body be respectively coupled to the second positive electrode and the second negative electrode on the chamber structure. Accordingly, the adapter can be coupled to the computer device by the plug assembly of the present invention, such that the adapter is capable of charging a battery of the computer device or directly supplying electrical power to the computer device for a user to perform operation such as typing, playing multi-media and so on. In addition, when the cable connected to the adapter is pulled, the first engaging portion on the main body of the first plug can be separated from the second engaging portion on the chamber structure of the second plug, so as to make the main body of the first plug separate from the chamber structure of the second plug. In such a manner, the present invention can prevent a power jack of the computer device from being damaged due to pulling force of the cable, so as to protect the computer device and enhance convenience of the computer device in use.

These and other objectives of the present invention will no doubt become obvious to those of ordinary skill in the art after reading the following detailed description of the embodiment that is illustrated in the various figures and drawings.

DETAILED DESCRIPTION

Figure 1:
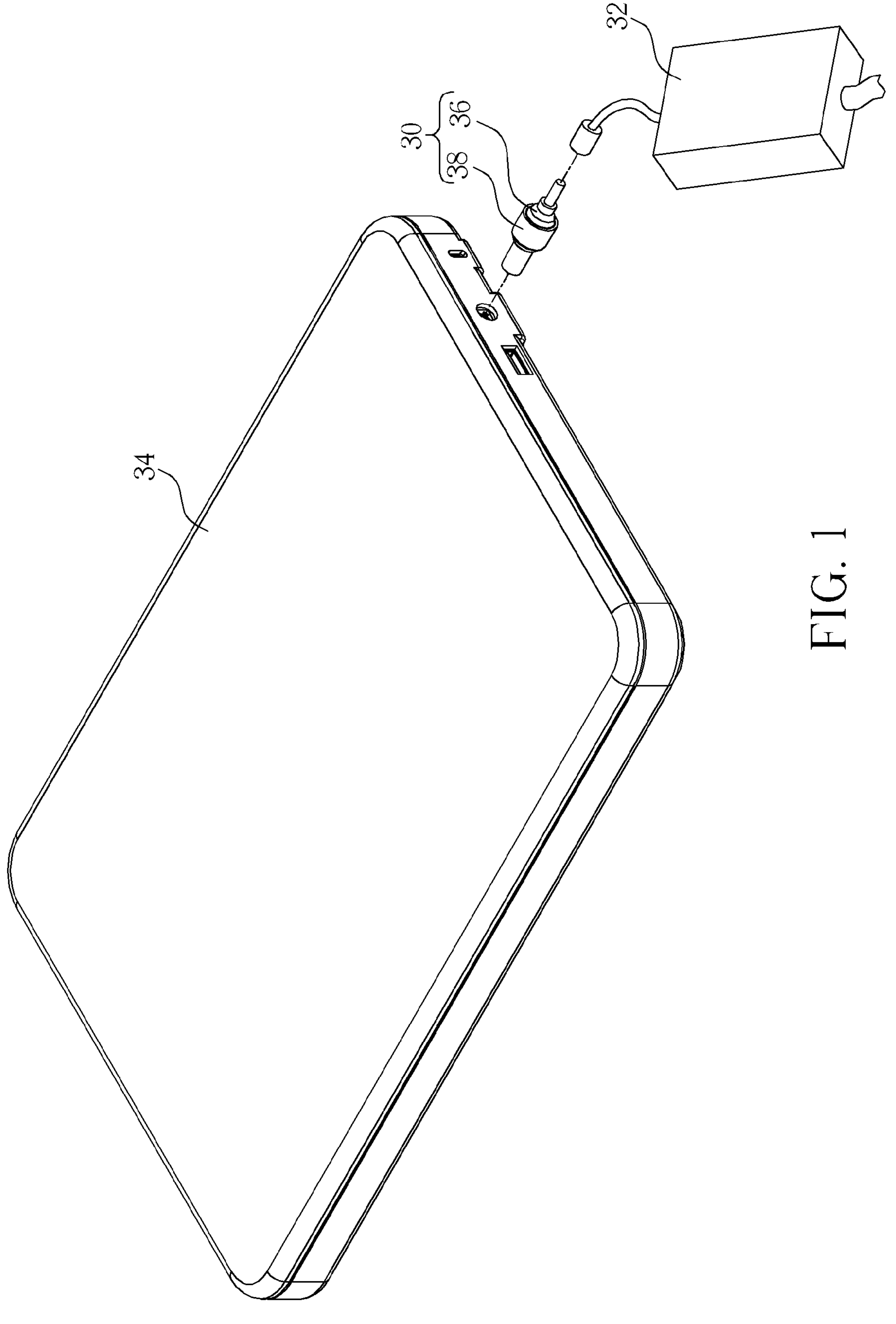
FIG. 1 is a diagram of a plug assembly according to an embodiment of the present invention.

Please refer to FIG. 1. FIG. 1 is a diagram of a plug assembly 30 according to an embodiment of the present invention. As shown in FIG. 1, the plug assembly 30 is used for coupling to an adapter 32 and a computer device 34. The plug assembly 30 includes a first plug 36 and a second plug 38. The first plug 36 is coupled to the adapter 32 and the second plug 38 is coupled to the computer device 34. In this embodiment, the computer device 34 can be, but not limited to, a notebook computer, and the plug assembly 30 can be coupled to a power jack of the notebook computer. In addition, the computer device 34 can be a tablet computer or a Personal Digital Assistant (PDA), etc. Furthermore, a plug (not shown in figures) is disposed on the other end of the adapter 32 for coupling to an external power supply, such that the adapter 32 can receive electrical power from the external power supply and charge the computer device 34.

In this embodiment, the first plug 36 is coupled to the adapter 32, and the second plug 38 is coupled to the computer device 34, but it is not limited to those mentioned above. For example, the first plug 36 can be coupled to the computer device 34, and the second plug 38 can be coupled to the adapter 32 as well. In other words, one of the first plug 36 and the second plug 38 is coupled to the adapter 32, and the other one of the first plug 36 and the second plug 38 is coupled to the computer device 34. As for which design is adopted, it depends on practical demands.

As mentioned above, the external power source can charge a battery of the computer device 34 or directly supply electrical power to the computer device 34 for a user to perform operation such as typing, playing multi-media and so on by the adapter 32 and the plug assembly 30.

Figure 2:
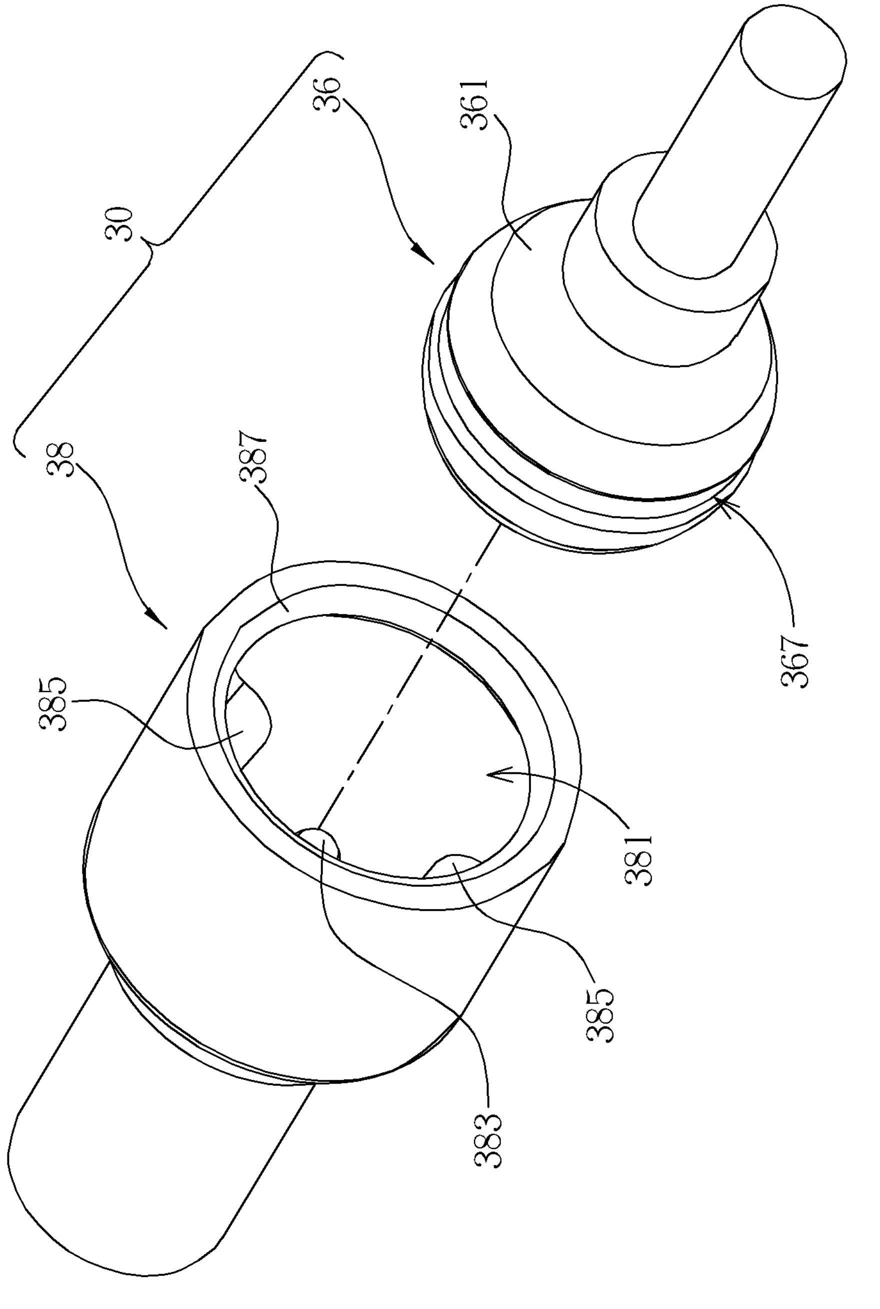
FIG. 2 is an exploded diagram of the plug assembly according to the embodiment of the present invention.
Figure 3:
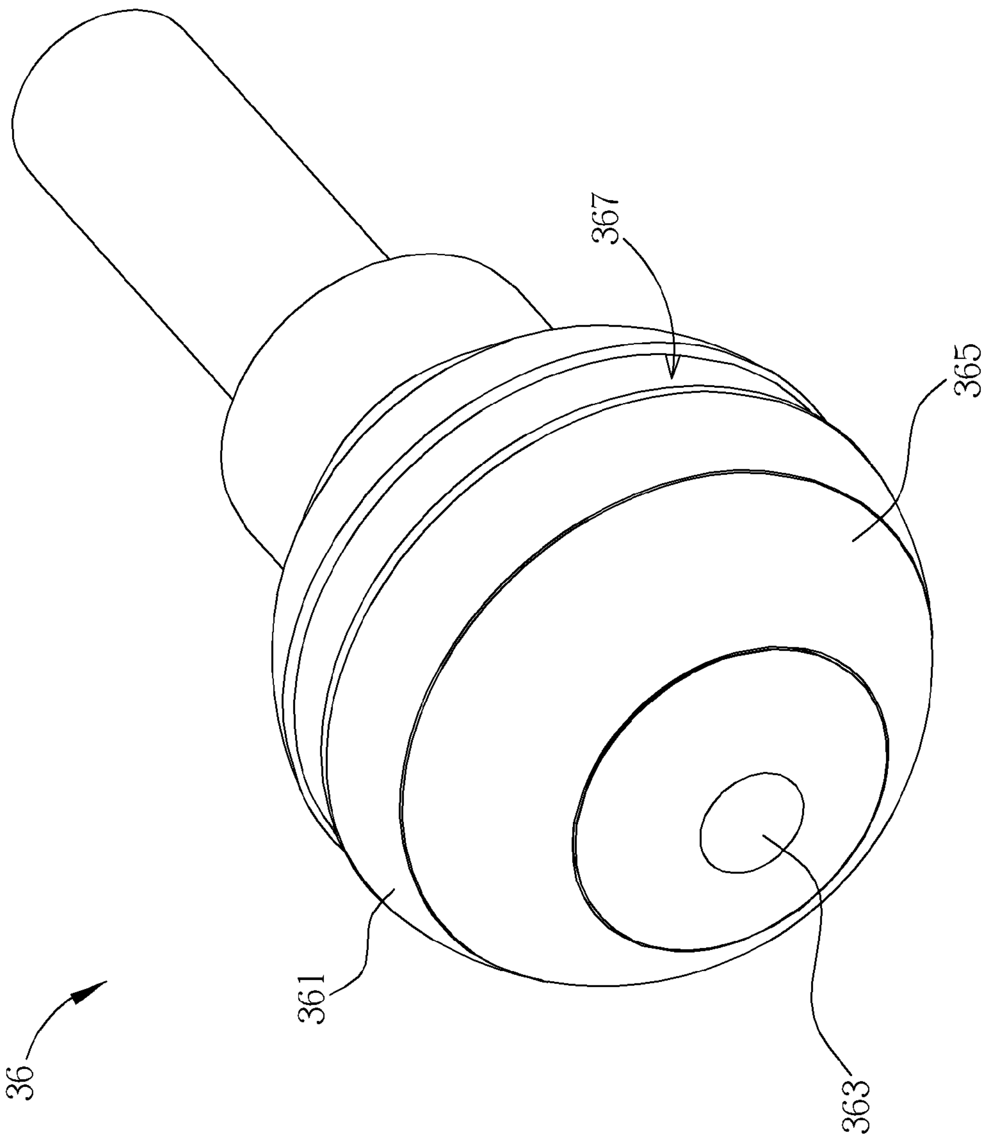
FIG. 3 is a diagram of a first plug according to the embodiment of the present invention.
Figure 4:
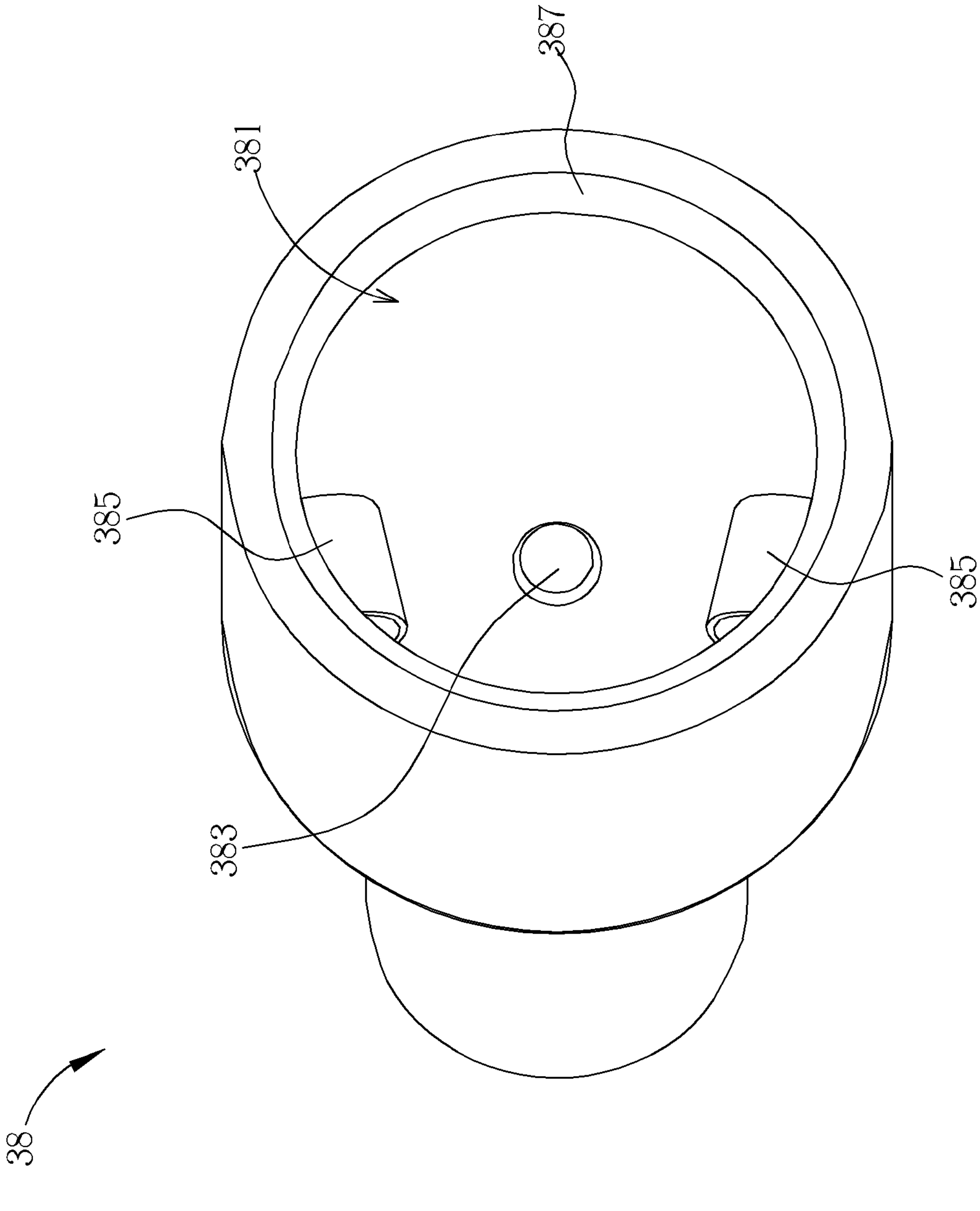
FIG. 4 is a diagram of a second plug according to the embodiment of the present invention.

Please refer to FIG. 2 to FIG. 4. FIG. 2 is an exploded diagram of the plug assembly 30 according to the embodiment of the present invention, FIG. 3 is a diagram of the first plug 36 according to the embodiment of the present invention, and FIG. 4 is a diagram of the second plug 38 according to the embodiment of the present invention. As shown in FIG. 2 to FIG. 4, the first plug 36 includes a main body 361, and a first positive electrode 363, a first negative electrode 365 and a first engaging portion 367 are formed on the main body 361. The second plug 38 has a chamber structure 381 for containing the main body 361 of the first plug 36. A second positive electrode 383, a second negative electrode 385 and a second engaging portion 387 are formed on the chamber structure 381 and respectively located in positions corresponding to the first positive electrode 363, the first negative electrode 365 and the first engaging portion 367. In practical application, the first positive electrode 363 and the first negative electrode 365 as well as the second positive electrode 383 and the second negative electrode 385 can be formed on the main body 361 and the chamber structure 381 in an insert molding manner, respectively. In addition, the structural body of the chamber structure 381 of the second plug 38 can be made of rubber material.

In this embodiment, the main body 361 of the first plug 36 can be substantially a spherical structure, and the chamber structure 381 of the second plug 38 can substantially be a spherical chamber structure for combining the main body 361 of the first plug 36. Furthermore, the first engaging portion 367 can be a ring-shaped recess surrounding the surface of the spherical structure, and the second engaging portion 387 can be a ring-shaped protrusion for engaging the first engaging portion 367. It should be noticed that designs of the first engaging portion 367 and the second engaging portion 387 are not limited to those mentioned in the aforesaid embodiment. For example, they can be a hook structure and a slot structure, respectively. In other words, one of the first engaging portion 367 and the second engaging portion 387 can be the hook structure, and the other one of the first engaging portion 367 and the second engaging portion 387 can be the slot structure. The structures capable of fixing the first plug 36 and the second plug 38 are within scope of the present invention.

Figure 5:
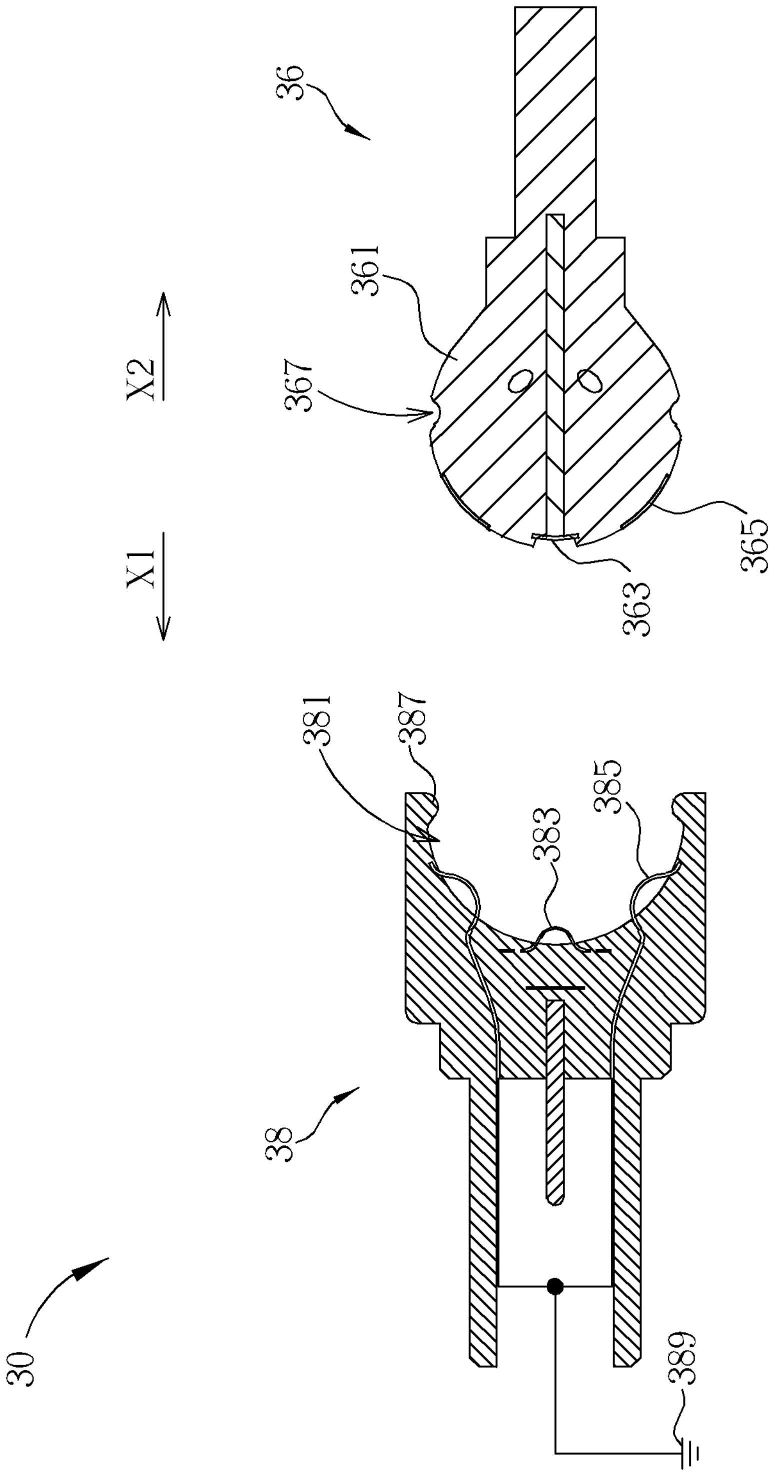
FIG. 5 is an exploded sectional diagram of the plug assembly according to the embodiment of the present invention.
Figure 6:
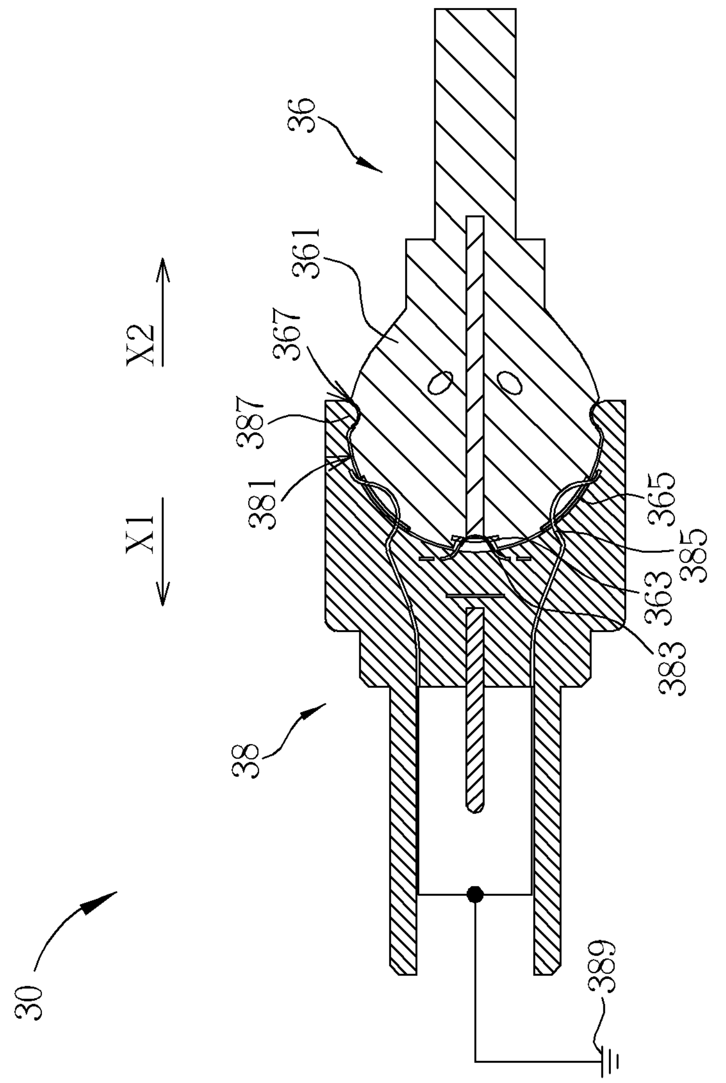
FIG. 6 is an assembly sectional diagram of the plug assembly according to the embodiment of the present invention.

More detailed description for principle of the first plug 36 and the second plug 38 of the plug assembly 30 are provided as follows. Please refer to FIG. 5 and FIG. 6. FIG. 5 is an exploded sectional diagram of the plug assembly 30 according to the embodiment of the present invention, and FIG. 6 is an assembly sectional diagram of the plug assembly 30 according to the embodiment of the present invention. As shown in FIG. 5 and FIG. 6, the main body 361 of the first plug 36 can be inserted into the chamber structure 381 of the second plug 38 as the main body 361 of the first plug 36 moves in a first direction X1 as shown in FIG. 5. The chamber structure 381 can completely contain the main body 361 as the main body 361 moves in the first direction X1 from a position shown in FIG. 5 to a position shown in FIG. 6. In the meanwhile, the second positive electrode 383 and the second negative electrode 385 can respectively contact the first positive electrode 363 and the first negative electrode 365, and the second engaging portion 387 can engage the first engaging portion 367, such that the main body 361 of the first plug 36 can be hold in the chamber structure 381 of the second plug 38. Accordingly, the first plug 36 can be coupled to the second plug 38, so as to make the external power source be coupled to the computer device 34 by the adapter 32 and the plug assembly 30. It should be noticed that the spherical structure of the main body 361 can guide the ring-shaped protrusion of the second engaging portion 387 to engage with the ring-shaped recess when the spherical structure is inserted into the chamber structure 381.

On the other hand, the first engaging portion 367 can be separated from the second engaging portion 387 when the second plug 38 is pulled. Accordingly, the main body 361 can easily move from the position shown in FIG. 6 to the position shown in FIG. 5 in a second direction X2 which is opposite to the first direction X1. In other words, by the structural design that the main body 361 of the first plug 36 is capable of being separated from the chamber structure 381 of the second plug 38, the present invention can prevent joint where the second plug 38 combines with the computer device 34 from bending deformation or breaking due to being pulled by an external force. In such a manner, it can prevent the power jack of the computer device 34 from being damaged due to the pulling by the external force, so as to protect the computer device 34 and enhance convenience of the computer device 34 in use. It should be noticed that since the structural body of the chamber structure 381 is made of rubber material in this embodiment, it has a larger elastic coefficient. Thus, the chamber structure 381 is capable of bearing a larger elastic deformation due to the larger elastic coefficient when the main body 361 of the first plug 36 is separated from the chamber structure 381 of the second plug 38. In such a manner, it can avoid the chamber structure 381 from being damaged during process of the main body 361 being separated from the chamber structure 381.

It should be noticed that the first positive electrode 363 is a contact structure disposed on a surface of the spherical structure, and the first negative electrode 365 is a ring-shaped structure surrounding the surface of the spherical structure as shown in FIG. 3 in this embodiment. In addition, the second negative electrode 385 can be coupled to a grounding end 389. Furthermore, since the contact structure of the first positive electrode 363 and the ring-shaped structure of the first negative electrode 365 are in sequence disposed on the spherical structure of the main body 361 in the second direction X2, the first negative electrode 365 will contact the second negative electrode 385 first, and then the first positive electrode 363 contacts the second positive electrode 383 during the process that the main body 361 of the first plug 36 moves from the position shown in FIG. 5 in the first direction X1 to be inserted into the chamber structure 381 of the second plug 38. Since the second negative electrode 385 is coupled to the grounding end 389, the second negative electrode 385 will be coupled to the grounding end 389 first, and then the electrodes are coupled to each other. According to the above-mentioned design, the present invention can prevent the computer device 34 from being damaged due to static electricity shock. In other words, the first negative electrode 365 and the first positive electrode 363 of the first plug 36 of the present invention contacts the second negative electrode 385 and the second positive electrode 383 of the second plug 38 in sequence as the main body 361 is inserted into the chamber structure 381.

Figure 7:
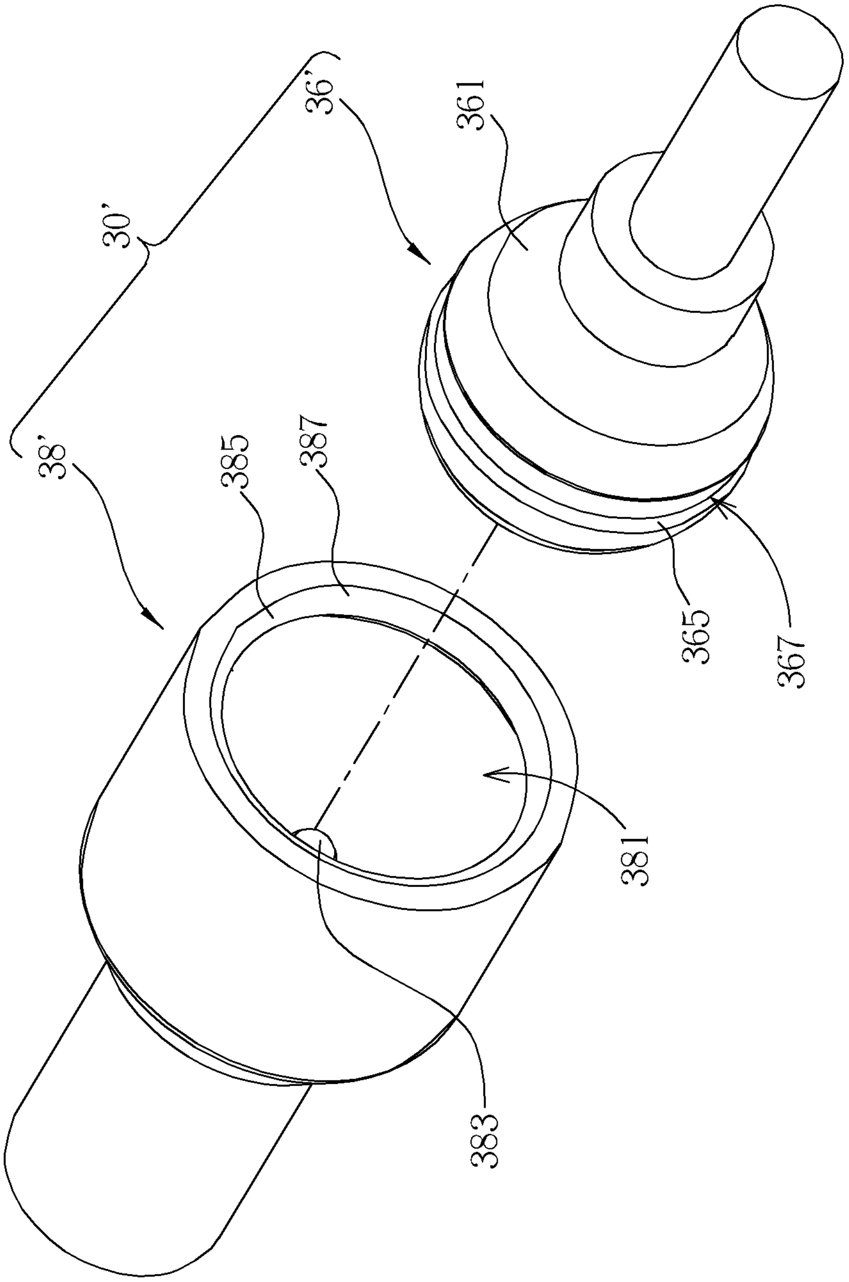
FIG. 7 is an exploded diagram of a plug assembly according to another embodiment of the present invention.

Please refer to FIG. 7. FIG. 7 is an exploded diagram of a plug assembly 30' according to another embodiment of the present invention. As shown in FIG. 7 and FIG. 2, the main difference between the plug assembly 30' and the aforesaid plug assembly 30 is that the first engaging portion 367 on a first plug 36' of the plug assembly 30' is combined with the first negative electrode 365, and the second engaging portion 387 on a second plug 38' is combined with the second negative electrode 385. For example, the aforesaid engaging portions and the negative electrodes can be combined in a stamping manner to make the engaging portions be integrally formed on metal parts applied for the negative electrodes. In addition, the first engaging portion 367, the first negative electrode 365 and the first positive electrode 363 of the first plug 36' as well as the second positive electrode 383, the second negative electrode 385 and the second engaging portion 387 of the second plug 38' can be respectively integrally formed on the main body 361 of the first plug 36' and the chamber structure 381 of the second plug 38' in the insert molding manner. It should be noticed that components with the same numerals in FIG. 7 and FIG. 2 represent the same structures and functions, so detailed description is omitted herein for simplicity.

Figure 8:
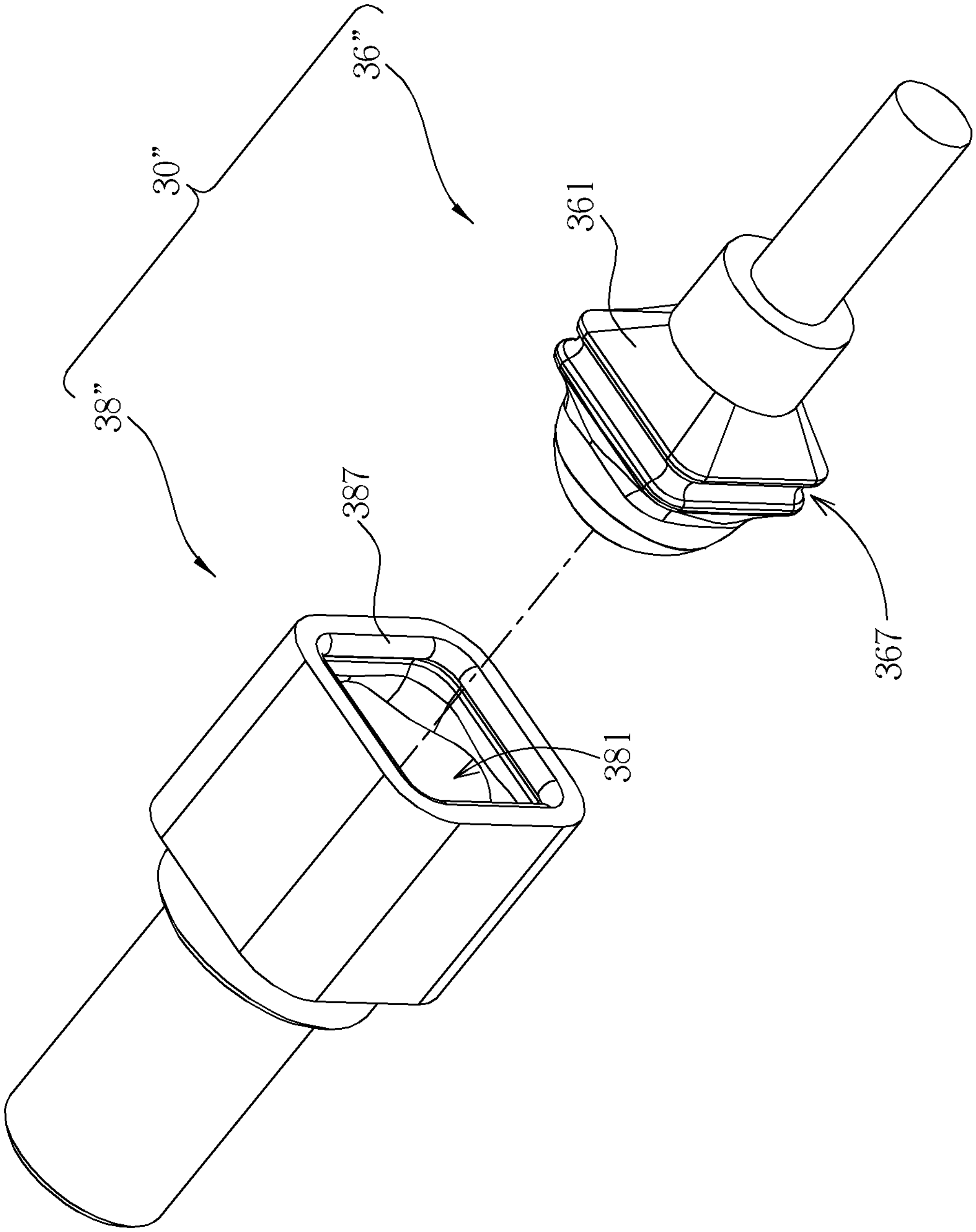
FIG. 8 is an exploded diagram of a plug assembly according to another embodiment of the present invention.
Figure 9:
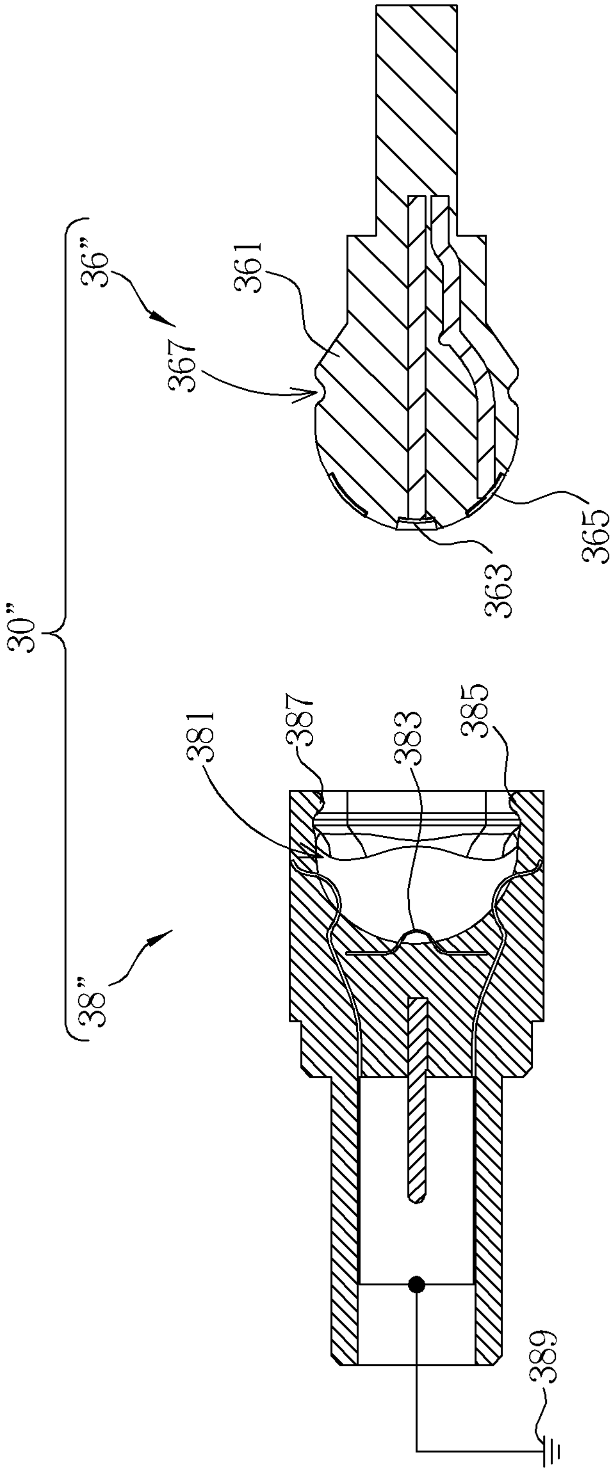
FIG. 9 is an exploded sectional diagram of the plug assembly according to another embodiment of the present invention.

Please refer to FIG. 8. FIG. 8 is an exploded diagram of a plug assembly 30" according to another embodiment of the present invention. As shown in FIG. 8 and FIG. 2, the main different between the plug assembly 30" and the aforesaid plug assembly 30 is that the main body 361 of a first plug 36" of the plug assembly 30" is substantially a square post structure, and the chamber structure 381 of a second plug 38" of the plug assembly 30" is substantially a square chamber structure. In addition, please refer to FIG. 9. FIG. 9 is an exploded sectional diagram of the plug assembly 30" according to another embodiment of the present invention. As shown in FIG. 9, since the structure design and the disposal sequence on the main body 361 of the first positive electrode 363 and the first negative electrode 365 of the first plug 36" are the same as those in the aforesaid first plug 36, the first negative electrode 365 and the first positive electrode 363 of the first plug 36" contact the second negative electrode 385 and the second positive electrode 383 of the second plug 38" in sequence as the main body 361 is inserted into the chamber structure 381. It should be noticed that components with the same numerals in FIG. 8 and FIG. 9 as well as in FIG. 2 and FIG. 5 represent the same structures and functions, so detailed description is omitted herein for simplicity.

Compared with the prior art, the present invention utilizes the first engaging portion disposed on the main body of the first plug to engage the second engaging portion on the chamber structure of the second plug, so as to make the main body be contained in the chamber structure as well as make the first positive electrode and the second negative electrode on the main body be respectively coupled to the second positive electrode and the second negative electrode on the chamber structure. Accordingly, the adapter can be coupled to the computer device by the plug assembly of the present invention, such that the adapter is capable of charging a battery of the computer device or directly supplying electrical power to the computer device for a user to perform operation such as typing, playing multi-media and so on. In addition, when the cable connected to the adapter is pulled, the first engaging portion on the main body of the first plug can be separated from the second engaging portion on the chamber structure of the second plug, so as to make the main body of the first plug separate from the chamber structure of the second plug. In such a manner, the present invention can prevent a power jack of the computer device from being damaged due to pulling force of the cable, so as to protect the computer device and enhance convenience of the computer device in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A plug assembly adapted to an adapter and a computer device, comprising:

a first plug comprising a main body being substantially a spherical structure whereon a first positive electrode, a first negative electrode and a first engaging portion are formed; wherein the first engaging portion is a ring-shaped recess surrounding to the surface of the spherical structure; and a second plug having a chamber structure being substantially a spherical chamber structure for containing the main body, a second positive electrode, a second negative electrode coupled to a grounding end, and a second engaging portion being formed on the chamber structure and respectively located in positions corresponding to the first positive electrode, the first negative electrode and the first engaging structure, the second positive electrode and the second negative electrode being respectively coupled to the first positive electrode and the first negative electrode, wherein the second engaging portion is a ring-shaped protrusion, and the spherical structure guides the ring-shaped protrusion to engage the ring-shaped recess when the spherical structure is inserted into the chamber structure, such that the main body is held inside the chamber structure as the chamber structure completely contains the main body;

wherein one of the first engaging portion and the second engaging portion is a hook structure, and the other one of the first engaging portion and the second engaging portion is a slot structure;

wherein one of the first plug and the second plug is coupled to the adapter, and the other one of the first plug and the second plug is coupled to the computer device.

2. The plug assembly of claim 1, wherein the first positive electrode is a contact structure disposed on a surface of the spherical structure, the first negative electrode is a ring-shaped structure surrounding the surface of the spherical structure, and the first negative electrode and the first positive electrode of the first plug contact the second negative electrode and the second positive electrode of the second plug in sequence when the main body is inserted into the chamber structure.

3. The plug assembly of claim 1, wherein the first positive electrode and the first negative electrode, and the second positive electrode and the second negative electrode are integrally formed on the main body and the chamber structure in an insert molding manner, respectively.

4. The plug assembly of claim 1, wherein the first engaging portion is combined with the first negative electrode, and the second engaging portion is combined with the second negative electrode.

5. The plug assembly of claim 4, wherein the first positive electrode, the first negative electrode and the first engaging portion, and the second positive electrode, the second negative electrode and the second engaging portion are integrally formed on the main body and the chamber structure in an insert molding manner, respectively.

* * * * *